Feb. 21, 1950 R. BRUNKEN 2,498,600
HYDRAULIC TRANSMISSION AND CONTROL MECHANISM THEREFOR
Filed March 19, 1945 12 Sheets-Sheet 1

Fig.1

INVENTOR.
RENKE BRUNKEN
BY
ATTORNEYS

Feb. 21, 1950 R. BRUNKEN 2,498,600
HYDRAULIC TRANSMISSION AND CONTROL MECHANISM THEREFOR
Filed March 19, 1945 12 Sheets-Sheet 3

INVENTOR.
RENKE BRUNKEN
BY Richey & Watts.
ATTORNEYS

Feb. 21, 1950 R. BRUNKEN 2,498,600
HYDRAULIC TRANSMISSION AND CONTROL MECHANISM THEREFOR
Filed March 19, 1945 12 Sheets-Sheet 4

INVENTOR.
RENKE BRUNKEN
BY
*Richey & Watts*
ATTORNEYS

Feb. 21, 1950 R. BRUNKEN 2,498,600
HYDRAULIC TRANSMISSION AND CONTROL MECHANISM THEREFOR
Filed March 19, 1945 12 Sheets-Sheet 5

INVENTOR.
RENKE BRUNKEN
ATTORNEYS

INVENTOR
RENKE BRUNKEN
ATTORNEYS

Patented Feb. 21, 1950

2,498,600

UNITED STATES PATENT OFFICE 2,498,600

HYDRAULIC TRANSMISSION AND CONTROL MECHANISM THEREFOR

Renke Brunken, Shaker Heights, Ohio, assignor to The White Motor Company, Cleveland, Ohio, a corporation of Ohio Application March 19, 1945, Serial No. 583,515

16 Claims. (Cl. 74—472)

This invention relates broadly to hydraulic transmissions of the type having change speed gearing associated therewith and more specifically to improvements in apparatus for the control of the gear shift mechanism therefor.

The invention further pertains to improvements in my copending applications Serial No. 436,443, filed March 27, 1942, entitled "Automatic gear shifting mechanisms for transmissions," now Patent No. 2,373,453, dated April 10, 1945, and Serial No. 546,891, filed July 27, 1944, entitled "Torque converter control."

One of the objects of the invention is to provide a transmission having a hydraulic unit therein which is coupled with an engine in such a manner as to facilitate the transmission of power from the engine through the hydraulic unit to a driven member or conversely from the driven member to the engine. By way of illustration, when a transmission embodying the present invention is mounted in a motor vehicle propulsion therein is effected by the engine through the hydraulic unit. When, however, the driving torque is reversed, as occurs when the vehicle descends a hill, the driving effort initiated by the inertia of the vehicle is transmitted through the hydraulic unit to the engine which then exerts a braking effort upon the vehicle.

Another object of the invention is to provide mechanism for shifting the change speed gears in response to the torque loads imposed upon the secondary member of the hydraulic unit and in addition a gear shift control set which is automatic of operation save when the torque resistance is low.

A further object of the invention is to provide a turbine brake which is automatic of operation during the actuation of the gear shift control set.

Other objects and advantages more or less ancillary to the foregoing and the manner in which all the various objects are realized will appear in the following description, which considered in connection with the accompanying drawings, sets forth the preferred embodiment of the invention.

Figure 1:
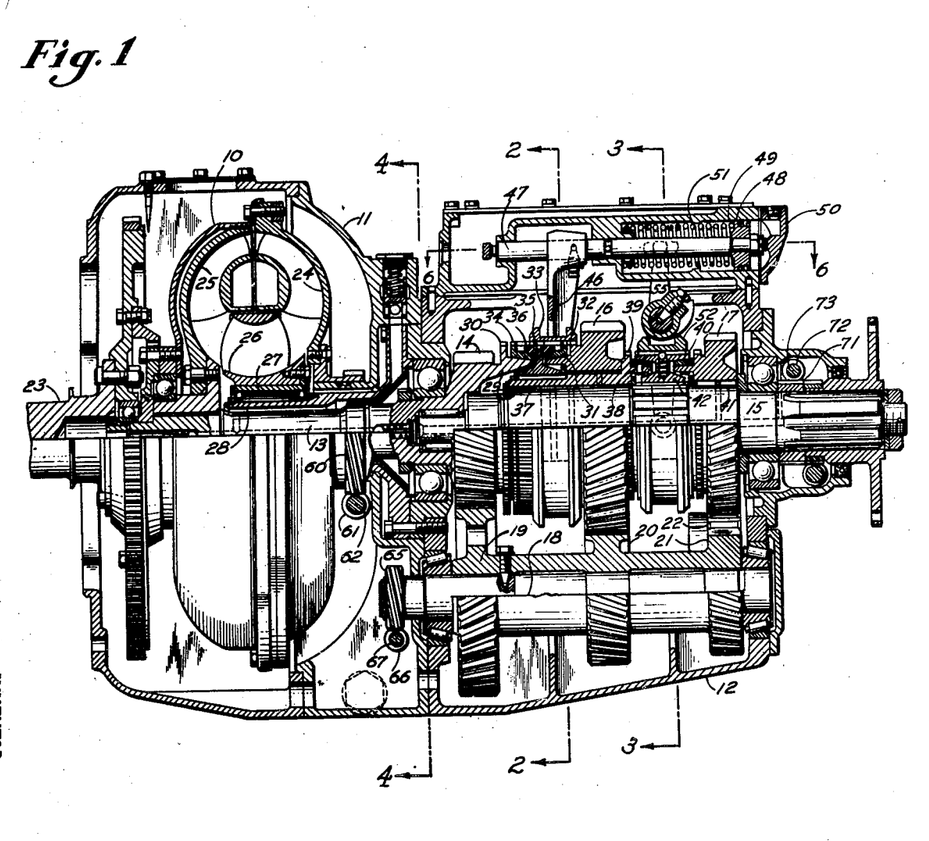
Fig. 1 is a longitudinal section through a transmission unit embodying the present invention.
Figure 2:
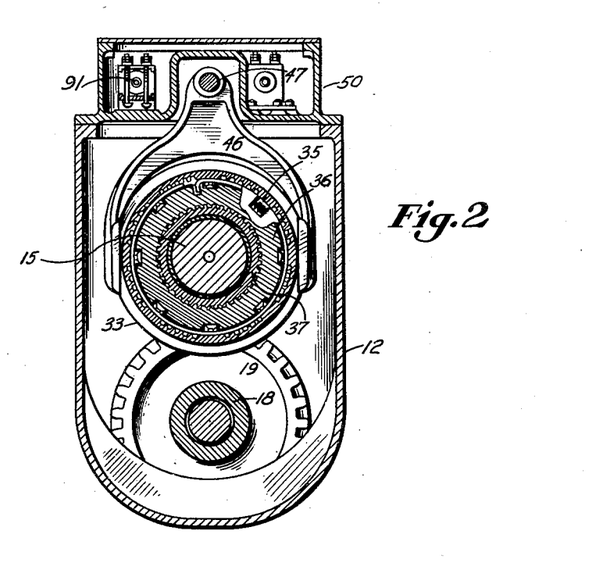
Fig. 2 is a cross section through the transmission, the section being taken on a plane indicated by the line 2—2 in Fig. 1.

Referring first to Fig. 1, the hydraulic torque converter 10 is mounted in an engine fly wheel bell housing 11, the outer end of which is machined for the support of a gear case 12. The change speed gearing is coupled with the torque converter and comprises, generally, a main shaft 13, having a drive gear 14 thereon, a driven shaft 15 having floating gears 16 and 17 thereon, and a countershaft 18 having stepped gears 19 and 20 and 21 thereon which are entrained respectively with the gears 14 and 16 and a reverse idler pinion 22 meshed with the gear 17.

The driving connection from the engine crankshaft 23 embodies a torque converter pump or driving member 24, a turbine or driven member 25 keyed to the shaft 13 and a reaction member 26 mounted upon a free wheeling mechanism 27 supported on a sleeve 28 surrounding the shaft 13 and affixed to the housing 11. The gear 14 as shown is integral with the shaft 13, the central portion thereof being bored to provide a pilot bearing for the end of the shaft 15. The outer end of the gear 14 is formed with a conical hub 29 having a toothed flange 30 thereon which is disposed in axial alignment with a hub 31 and flange 32 of similar configuration on the gear 16. The flanges 30 and 32 are splined for engagement with a broached yoke sleeve 33 which is mounted for sliding engagement upon the splined face of a pair of rings 34 and with the flange 30 or 32. The rings are bored in complemental configuration with the conical hubs 29 and 31 and are frictionally engaged therewith during translation of the sleeve 33 by springs 35 mounted in a spider 36 keyed to a sleeve 37 freely rotatable on the shaft 15. The gear and ring assembly considered in its entirety constitutes a synchromesh transmission unit of the blocker type and may be of any conventional form which is capable of effectuating synchronization of the rings with the splined flanges of the contiguous gears. The outer end of the sleeve 37 is formed with a conical hub 38 and a splined flange 39 adapted for operative engagement with the elements of a second synchromesh transmission unit 40 disposed between the sleeve 37 and the gear 17. The gear 17 is mounted on anti-friction bearings 41 on the shaft 15, the driving connection from the gear to the shaft being effected through the synchromesh unit and the splined engagement of a spider 42 with the shaft.

In operation of the transmission in direct drive, power from the engine is transmitted from the crankshaft 23 through the torque converter 10 to the shaft 13 through the gear 14 and synchromesh unit associated therewith to the sleeve 37 and through the synchromesh unit 40 to the shaft 15. Low gear operation is effected by the transmission of power from the engine through the shaft 23, the torque converter 10, the gears 14, 19, 20 and 16 through the synchromesh unit associated therewith to the sleeve 37 and through the second synchromesh unit 40 to the shaft 15. Reverse gear operation is effected by the transmission of power from the shaft 23 through the torque converter 10, the gears 14, 19, and 21, through the idler gear 22 to the gear 17, through the synchromesh unit 40 and spider 42 therein to the shaft 15.

Figure 3:
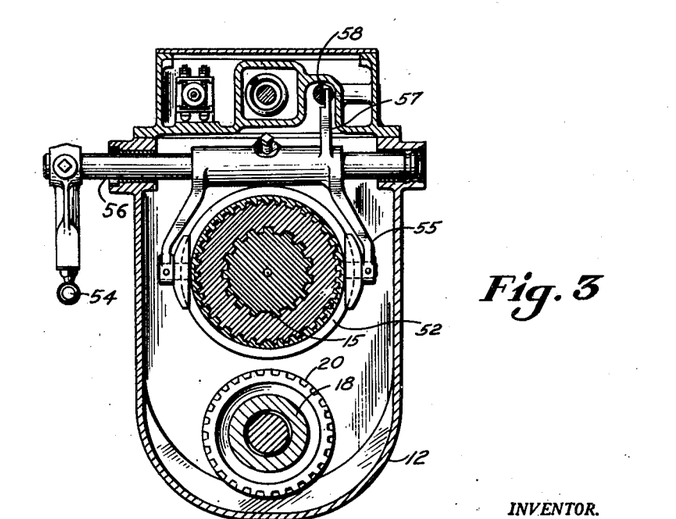
Fig. 3 is a cross section through an outer end of the transmission, the section being taken on a plane indicated by the line 3—3 in Fig. 1.
Figures 4, 5:
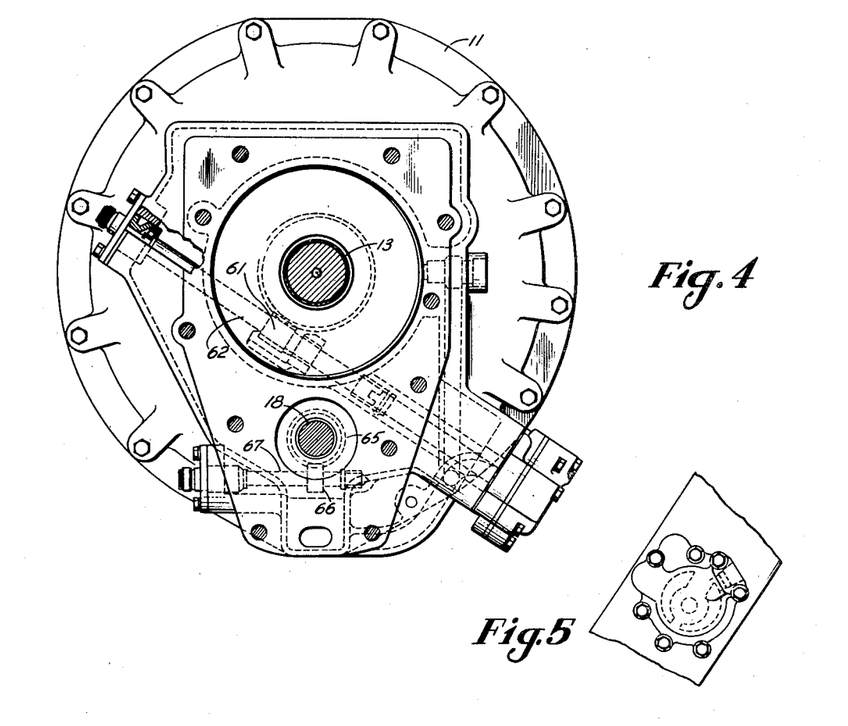
Fig. 4 is a cross section through the central portion of the transmission, the section being taken on a plane indicated by the line 4—4 in Fig. 1.
Fig. 5 is an elevational view of a fragmentary portion of the transmission housing illustrating the oil pump.
Figure 6:
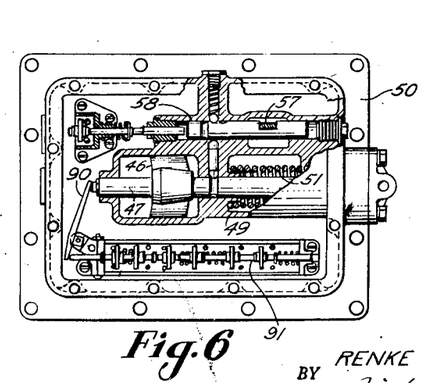
Fig. 6 is a horizontal section through the upper portion of the transmission illustrating the gear shift control mechanism, the section being taken on a plane indicated by the line 6—6 in Fig. 1.
Figure 7:
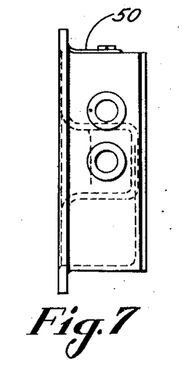
Fig. 7 is an end elevational view of the housing for the gear shift control mechanism.
Figures 8, 9:
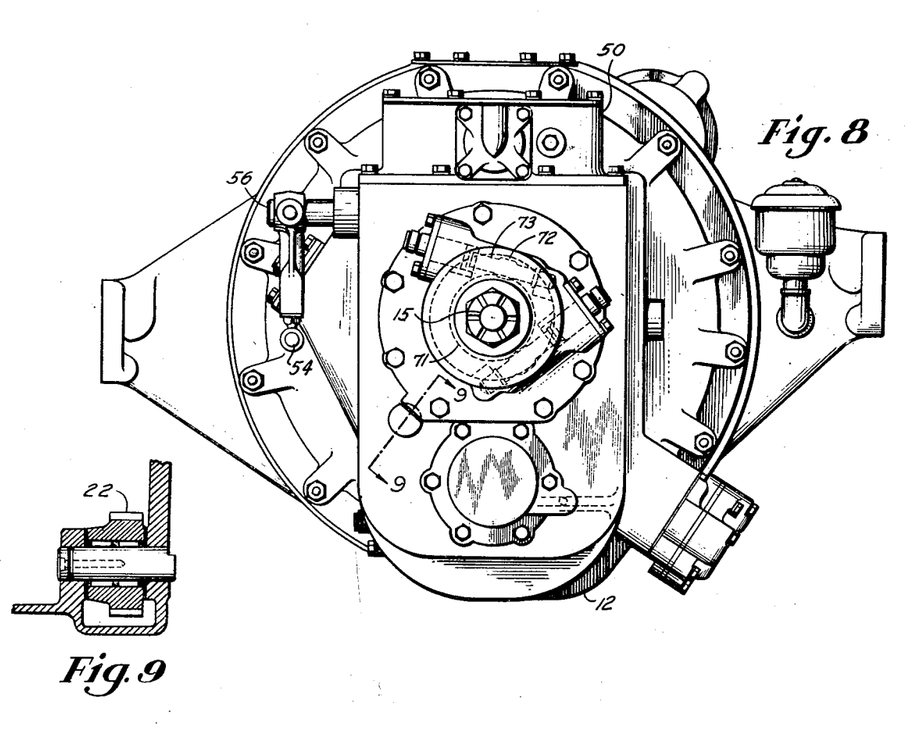
Fig. 8 is an end elevational view of the transmission shown in Fig. 1.
Fig. 9 is a sectional view of a fragmentary portion of the transmission gear set, the section being taken on a plane indicated by the line 9—9 in Fig. 8.

Actuation of the gear shift yoke sleeve 33 is effected through a fork 46 mounted on a rod 47 having a piston 48 thereon which is adapted for reciprocation within a cylinder 49 comprising the cover plate or upper housing 50 for the gear case 12. Movement of the piston inwardly is effected by the admission of fluid under pressure to the cylinder 49, return movement thereof being effected by a spring 51 intermediate the piston and the end wall of the cylinder. The yoke sleeve 52 in the second synchromesh unit 40 is adjusted manually to forward (F), neutral (N), or reverse (R) (see Fig. 10) by a gear shift lever 53 which is coupled through linkage 54 to a shifter fork 55 mounted on a bar 56. As shown in Figs. 3 and 6, the fork 55 is formed with a vertically disposed arm 57 which is engaged with a plunger 58 adapted to actuate a switch in the electric circuit for the instrumentalities controlling the movement of the fork 46.

The pump driving member 24 is provided with a worm wheel 60 meshed with a worm 61 having a drive shaft 62 (Fig. 10) thereon which is connected to a miter gear 63 for driving one side of a differential gear unit 64. The countershaft 18 is provided with a worm wheel 65 meshed with a worm 66 having a drive shaft 67 thereon which is connected to a miter gear 68 for driving the opposed side of the differential gear unit 64. The gear cage 69 of the differential 64 is operatively connected with a governor 70 which is organized to actuate a plurality of switches in the electric circuit controlling the operation of the gear shift actuating mechanism. The shaft 15 is provided with a worm wheel 71 meshed with a worm 72 having a drive shaft 73 thereon which is connected to a miter gear 74 operatively connected with a governor 75 organized to actuate a second group of switches in the electric circuit controlling the gear shift actuating mechanism.

Figures 10, 11:
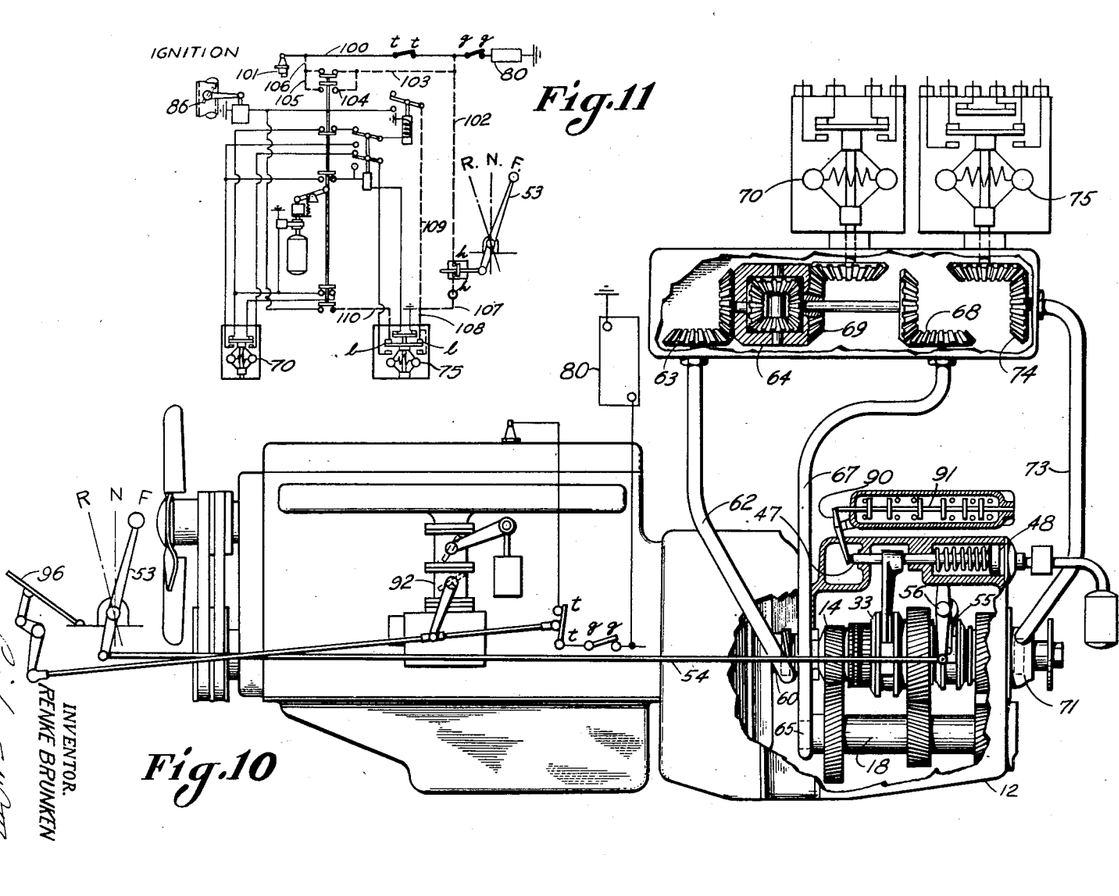
Fig. 10 is a diagrammatic view of an engine, the transmission and the control mechanism therefor, portions of the transmission being indicated in section in the interest of clarity.
Figs. 11 to 23, inclusive, are wiring diagrams of the change speed gear control mechanism, portions of the transmission and actuating elements therefor being rearranged relative to Fig. 10 and shown schematically in the interest of clarity. The heavy lines shown in the diagrams indicate the flow of current. The heavy broken lines indicate the wires having a voltage potential different from the grounded lines.

Referring now to Figs. 10 and 11 wherein the vehicle is assumed to be at rest, the engine idling, and the transmission adjusted for forward drive, it will be seen in the wiring diagram that current from the battery 80 will flow through the line 100, the switch $g$—$g$ and the accelerator switch $t$—$t$ to the engine ignition system 101. It will be further seen that the gear shift lever 53 when adjusted for forward drive (F) will close the switch $h$—$h$ and thus cause the potential of the line 100 to be applied to the switch $h$—$h$, the lines 102, 103, 104, 105, and 106 and the lines 107, 108, 109, the switch $l$—$l$ and the line 110. With the circuit in this condition the vehicle may be put in motion through actuation of the accelerator.

Figure 12:
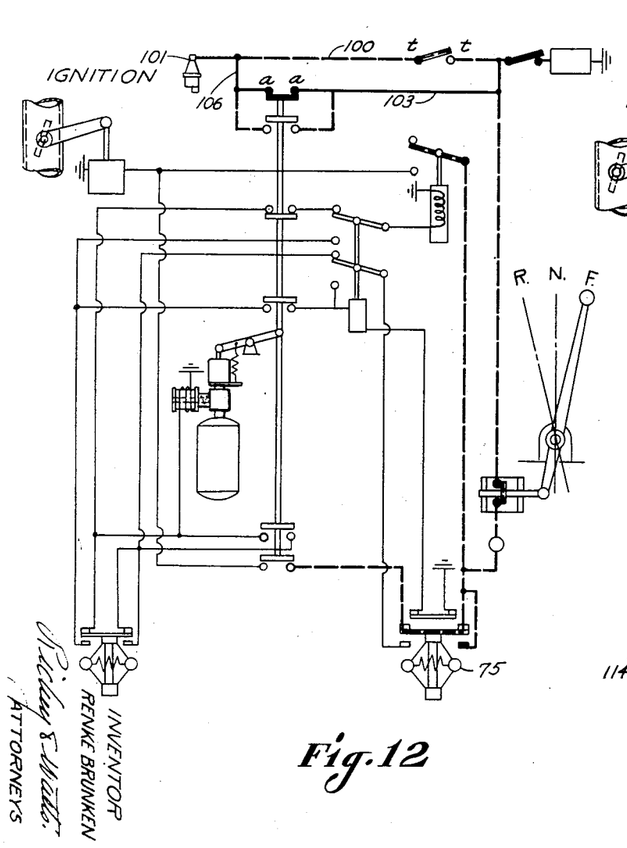

As shown in Fig. 12, when the vehicle is either at rest or moving at a rate of speed of less than eight miles per hour with the transmission in low gear and with the engine running at a speed above the idling rate thereof, depression of the accelerator will open the switch $t$—$t$ and permit current from the battery to flow through the line 103, the switch $a$—$a$ and the line 106 to the engine ignition system 101.

Figure 13:
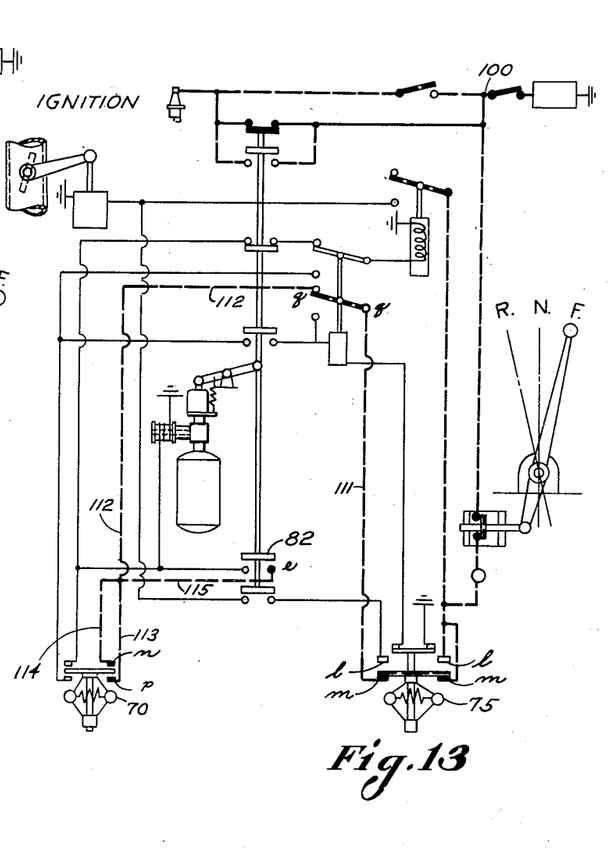

As soon as the vehicle attains sufficient speed for the governor 75 (Fig. 13) to open the switch $l$—$l$ and close the switch $m$—$m$ the potential of the line 100 will be applied to the line 111, the switch $q$—$q$, the lines 112, 113, 114 and 115, the contact points $n$ and $p$ in the switch associated with the governor 70 and the contact $e$ in the switch 82.

Figure 14:
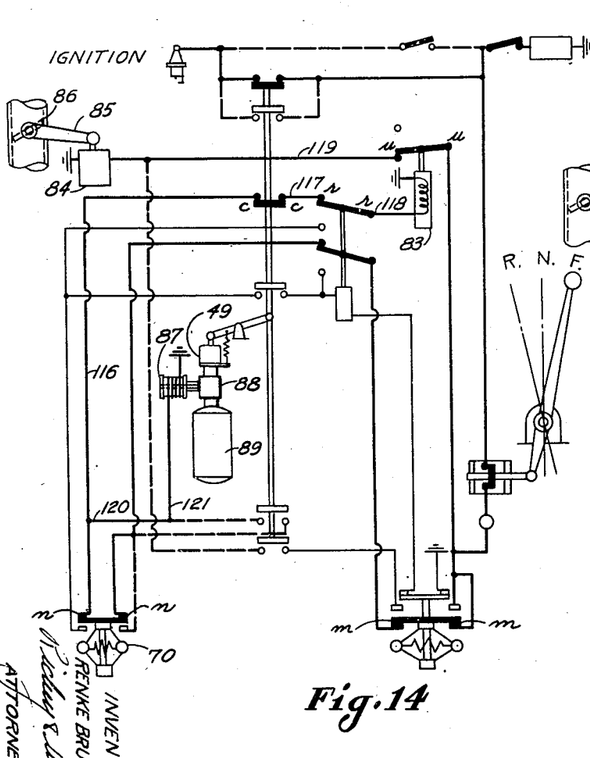

While the instruments and circuit are so adjusted the shift from low gear to high will be effected (Fig. 14) when the speed difference between the engine and turbine decreases to a predetermined minimum, i. e. a speed that will cause the governor 70 to close the switch $n$—$n$ and permit current to flow through the line 116, the switch $c$—$c$, the line 117, the switch $r$—$r$, the line 118, the solenoid 83 and thence to ground. When the solenoid 83 is excited, movement of the core therein will pull the pivotally mounted switch blade coupled therewith into circuit closing position between the contacts $u$—$u$ and permit current to flow through the line 119 to the carburetor solenoid 84. Energization of this solenoid will cause the retraction of the core therein, rock the arm 85 about its fulcrum and thus close the butterfly valve 86 in the carburetor auxiliary throttle chamber. With the closure of the switch $n$—$n$ current will flow through the lines 120 and 121 to the grounded solenoid 87, thus retracting the core therein which in turn will open the valve 88 coupled therewith and permit compressed air in the chamber 89 to enter the cylinder 49. As the engine speed falls, due to the actuation of the butterfly valve 86, as pointed out above, a torque reversal will occur in the synchromesh unit associated with the gear 14 and the fluid pressure now urging the piston 48 inwardly will effect the translation of the sleeve 33 into engagement with the splined flange 30, thus connecting the shaft 13 with the shaft 15 as heretofore described.

The valve 88 is not illustrated in detail in the drawings since it may be any suitable commercial valve capable of supplying the cylinder 49 with air from the compressed air supply so as to actuate the piston 48 against the force of the spring 51 and to disconnect the compressed air from the cylinder and provide an atmospheric exhaust from the cylinder so that the spring can retract the shifter fork. Valves capable of performing this function are numerous and are standard articles of commerce. Reference is made to Patent No. 2,322,479 of H. O. Schjolin, June 22, 1943, entitled "Torque converter-interlocking control, automatic," and particularly to Fig. 3 thereof for a disclosure of a solenoid operated valve of a type which may be employed in the combination disclosed herein.

Figure 15:
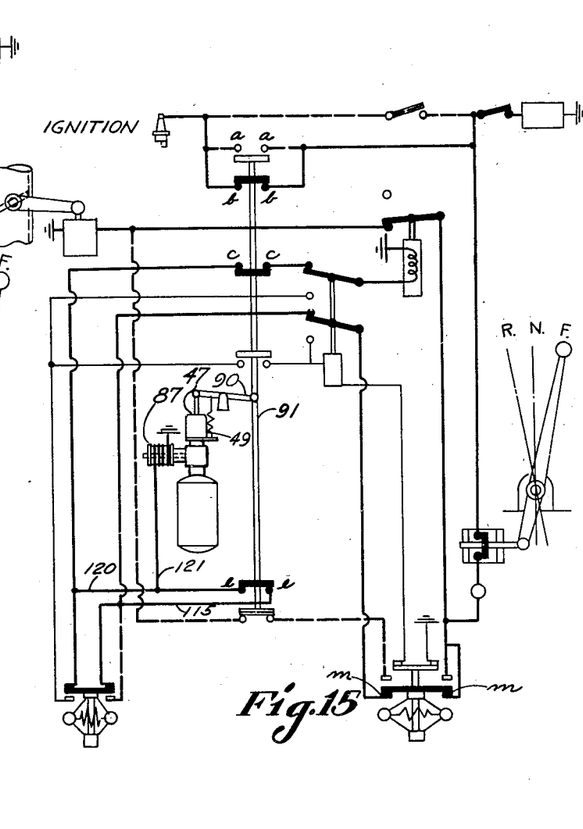

As will be seen in Figs. 6, 10 and 15, actuation of the piston rod 47 will rock the lever 90 and thus effect the translation of the plunger 91 in the gang switch associated therewith. Movement of the plunger consequent the shift into high gear, as described above, will bring the switch plate adjacent the contacts e—e into bridged relation therewith and current will now flow to the solenoid 87 through the lines 121, 120 and 115. The purpose of the secondary circuit is to prevent an interruption of the flow of compressed fluid to the cylinder 49 in the subsequent step where the switch c—c is opened. It will be noted that movement of the plunger 91 broke the circuit through the switch a—a and completed the circuit to the ignition system through the switch b—b. The load imposed through the interconnected shafts 13, 15 and the torque converter will cause a further deceleration of the engine.

Figure 16:
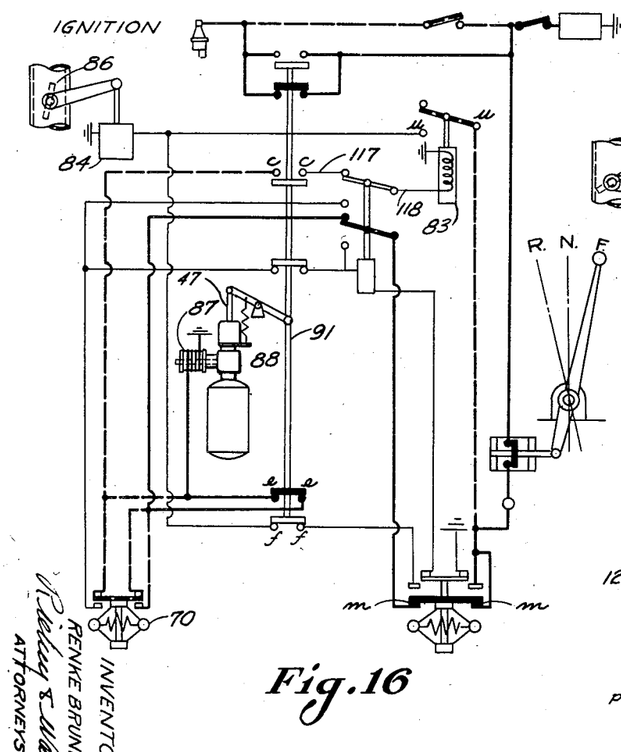

After synchronization of the cone 29 with the ring 34 continued movement of the rod 47 will effectuate the translation of the plunger 91 to its extreme position and thus break the circuit through the switch c—c. As will be seen in Fig. 16, interruption of the current through the lines 117 and 118 demagnetizes the solenoid 83 and permits a spring (not shown) therein to throw the switch u—u to its open position, thus breaking the circuit to the solenoid 84 and effecting the restoration of the butterfly valve 86 to its open position. The engine will now attain the speed determined by the position of the accelerator throttle 92. It will be noted that movement of the plunger 91 closed the switch f—f and that the piston was held in its retracted position throughout the shifting operation into high or direct drive through the preliminary closure of the switch e—e, the energization of the solenoid 87 and the consequent opening of the valve 88.

Figure 17:
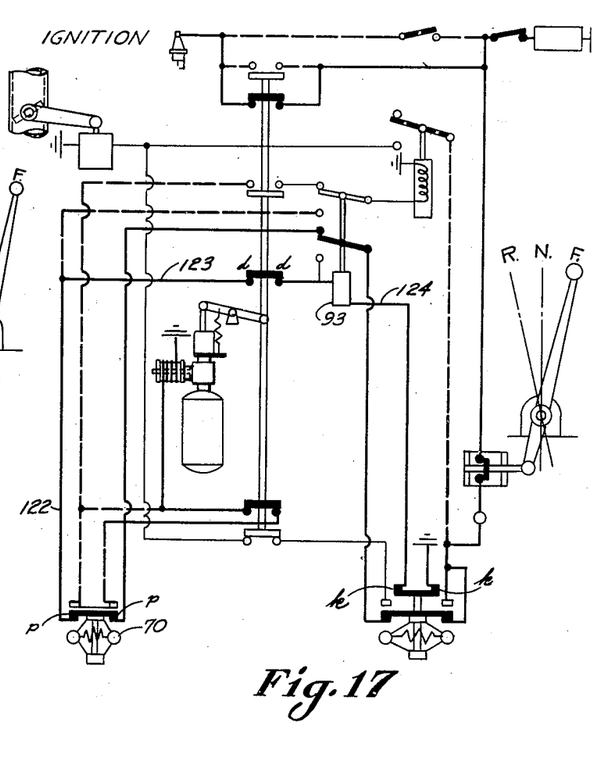

The shift from high to low gear drive is effected when the vehicle is brought to rest or when the torque demands exceed a certain maximum, such as may occur when the vehicle negotiates a steep hill. Under such conditions the turbine speed will gradually fall and the differential gear unit 64, as biased by the speed difference between the engine and the turbine, will operate the governor 70 at the requisite speed to actuate the switch p—p (Fig. 17) and establish a circuit through the lines 122, 123, the switch d—d, the solenoid 93, the line 124 and the switch k—k to ground.

Figure 18:
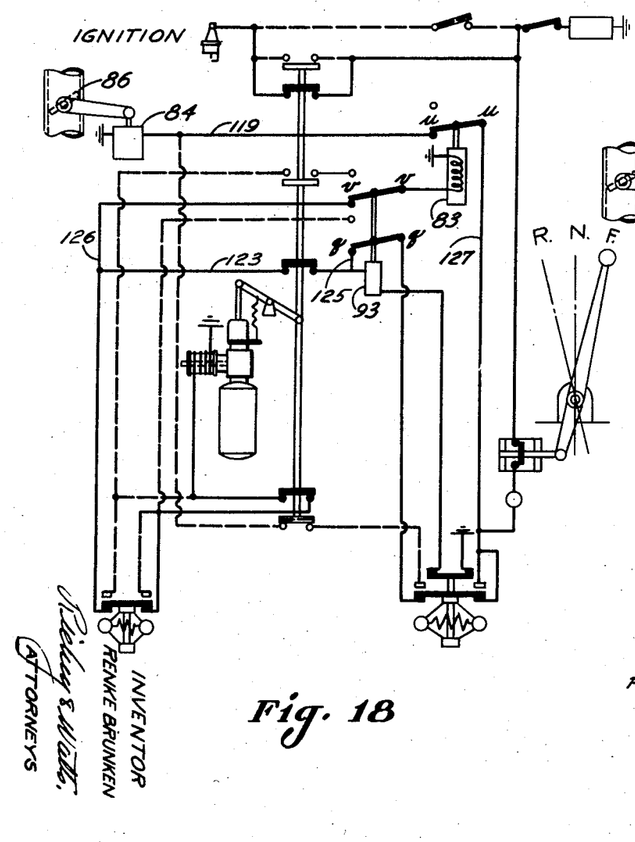

As the solenoid 93 is magnetized (Fig. 18) and the core therein retracted, the current will flow through the switch q—q, the lines 125, 123, 126 and the switch v—v to the solenoid 83, thus effecting the operation thereof and the actuation of the switch u—u. The current now flowing through the lines 127 and 119 will effect the operation of the solenoid 84 and the closure of the butterfly valve 86. As the engine speed drops consequent the latter adjustment of the valve 86 a torque reversal will be initiated between the driving and driven elements of the transmission which will relieve the tooth load on the splined flange 30 and broached sleeve 33 and facilitate the ready disengagement thereof.

Figure 19:
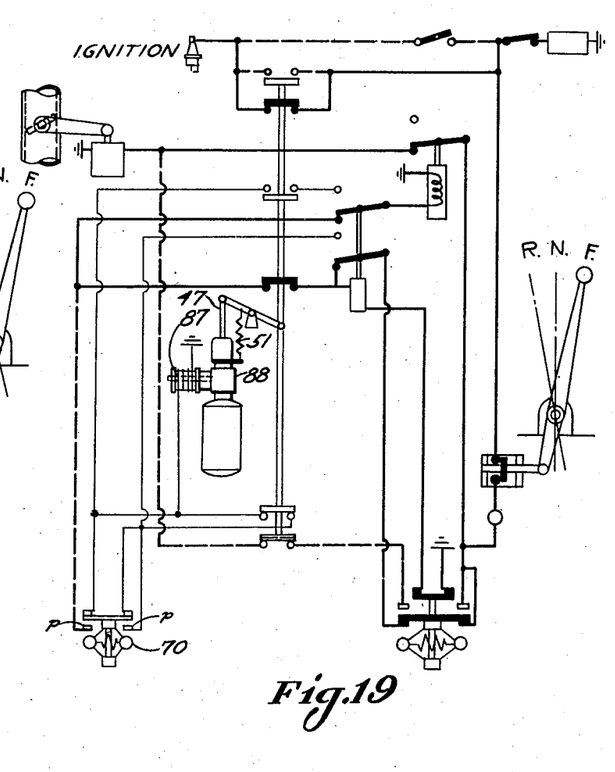

When the engine and turbine speeds are synchronized the differential gear unit 64 and in turn the governor 70 will open the switch p—p (Fig. 19) and thus break the circuit to the solenoid 87. Actuation of the solenoid and closure of the valve 88 will relieve the air pressure on the piston 48 and permit the spring 51 to effect the retraction thereof. As the piston rod 47 moves outwardly the yoke 46 thereon will shift the sleeve 33 out of engagement with the flange 30 and into position for engagement with the flange 32, thus organizing the driving and driven shafts for the subsequent low gear driving connection.

Figure 20:
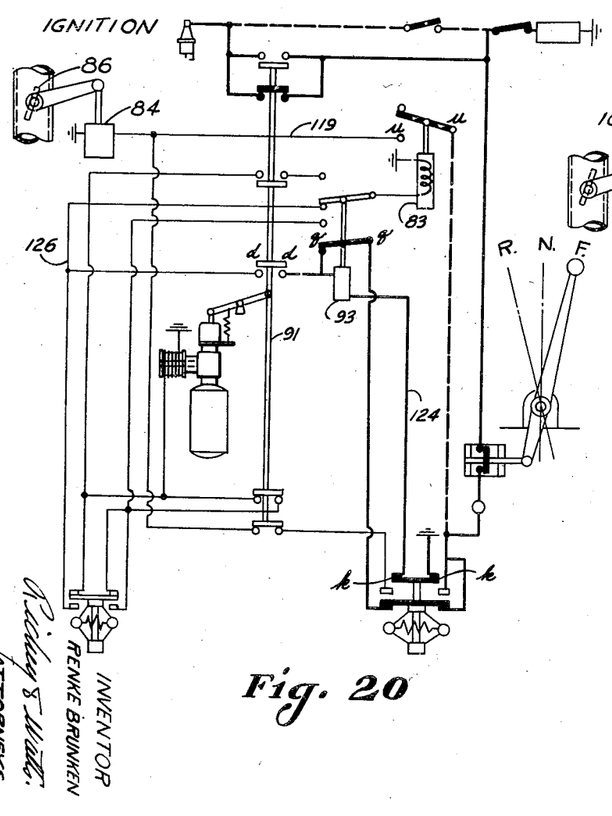

Referring now to Fig. 20, as the piston moves outwardly the plunger 91 will be retracted and break the circuit through the switch d—d, thus interrupting the flow of current through the line 126, and the solenoid 83 which will cause the actuation of the switch u—u under the influence of the spring associated therewith, break the circuit through the line 119, and the solenoid 84. As the latter solenoid is actuated, the butterfly valve 86 will be moved to its open position. The engine will now accelerate to the speed determined by the position of the throttle 92. Such acceleration will hasten the operation of the synchromesh unit and thus minimize the wear on the parts thereof. It will be noted that the solenoid 93 is now retained in its retracted position through a holding circuit which embodies the switch q—q, the solenoid 93, the line 124 and the grounded switch k—k.

Figure 21:
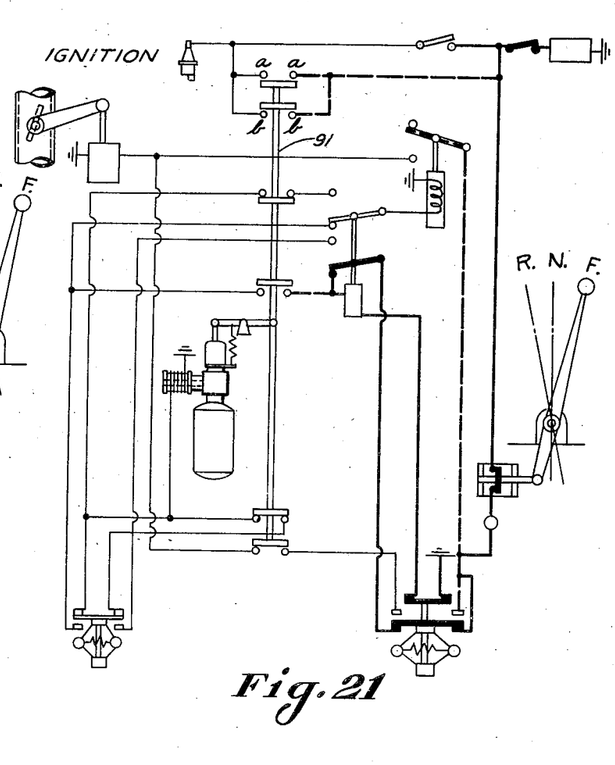

If translation of the sleeve 33 were attempted during the period of engine acceleration the teeth, i. e. the splined and broached elements of the mated parts of the synchromesh unit would clash with possible deleterious results. In order to eliminate this hazard the ignition circuit is momentarily interrupted incident the engagement of the sleeve. To this end the switch plates for the contacts a—a and b—b are mounted on the plunger 91 in such a manner as to effect the simultaneous interruption of the circuits through both pair of contacts during the initial movement of the plunger. This phase of the operative cycle is illustrated in Fig. 21.

Figure 22:
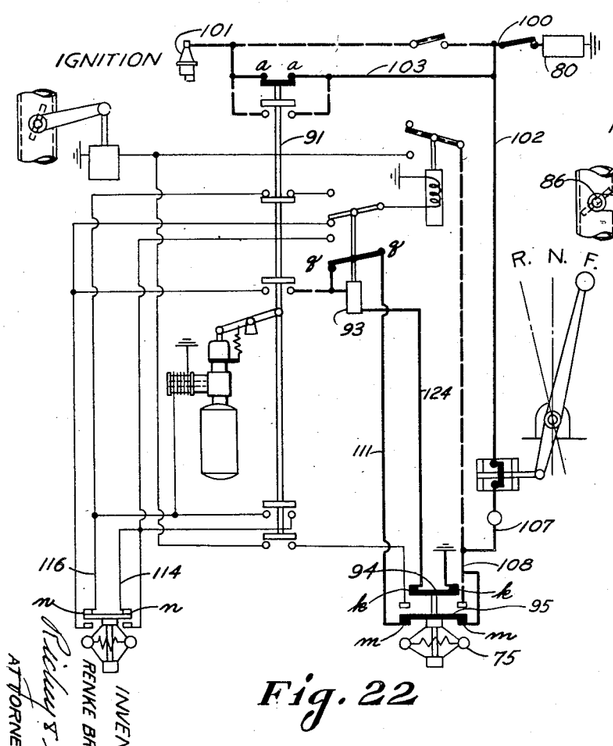

Completion of the shift to low gear and the holding circuit is shown in Fig. 22, where it will be noted that the switch a—a has been closed by the final movement of the plunger 91 which restores the circuit through the line 103 to the ignition system 101. The solenoid 93 at this period is held in its retracted position since the current still flows from the battery 80 through the lines 102—107—108, the switch m—m, the line 111, the switch q—q, the solenoid 93, the line 124 and the switch k—k to ground. While the circuit is in this condition a shift into high gear cannot occur even though the switch n—n is closed, since no current can flow through the switch while the solenoid 93 is retracted.

When, however, the holding circuit (lines 102 through 124 to ground) is broken by operation of either the switch k—k or m—m, the other instrumentalities in the electric system will be restored for functional operation as indicated in Fig. 12. The circuit through the switch k—k will be broken when the vehicle attains sufficient speed, say 20 miles per hour, to operate the governor 75 at a speed which will effect the retraction of the switch plate 94. The circuit through the switch m—m will be broken when the speed of the vehicle drops to a predetermined minimum, say 8 miles per hour, where the governor 75 will lift the plate 95 from its contacts. The advantage of this circuit resides in the provision of the mechanism for effectuating a time lapse of requisite duration to hold the transmission in low gear under such torque requirements as are customarily encountered in heavy traffic. A further advantage of the organization resides in the provision of a circuit which will prevent hunting of the instruments controlling the gear shift actuating mechanism.

Figure 23:
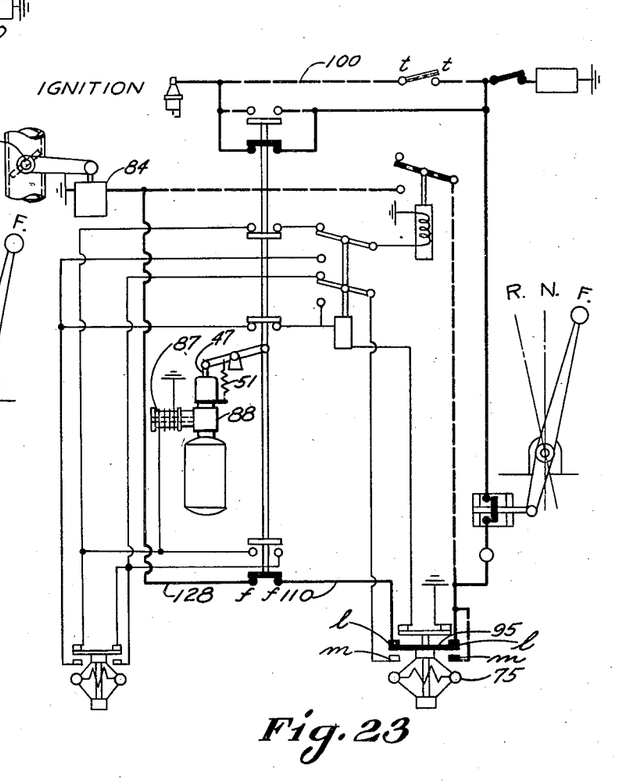

The shift into low gear at low speed (approximately eight miles per hour) is illustrated in Fig. 23. When the vehicle is stopped while in high gear, the governor 75 will move the plate 95 from the switch contacts m—m to the contacts l—l closing the circuit through the line 110, the switch f—f and the line 128 to the solenoid 84. Operation of the solenoid will close the butterfly valve 86, and as the engine decelerates cause a torque reversal between the driving and driven shafts which in turn will relieve the tooth pressure on the intermeshed sleeve 33 and flange 30. As the vehicle comes to rest the circuit through the switch m—m to the solenoid 87 will be broken (compare Fig. 23 with Figs. 14, 15 and 16 where the transmission is in high gear) and the valve 88 closed, thus permitting the spring 51 to shift the rod 47 and in turn the yoke sleeve 33 into the position of low gear engagement. When the switch t—t is held open as occurs when the accelerator 96 is depressed the shift into low gear will follow the sequential operations heretofore described. When, however, the switch is closed as occurs when the accelerator is disposed in its distal position, current will flow through the line 100 (see Fig. 11) to the ignition system and thus prevent stalling of the engine.

Should the operator of the vehicle depress the accelerator, when the vehicle is at rest on a slippery road surface such as ice, the driving wheels will spin and cause the turbine to accelerate. As the turbine approaches the proximate speed of the engine certain of the instruments will be adjusted to effect the initial step of the shift into high gear. With the circuit in the condition illustrated in Fig. 23, however, the solenoid 84 will close the butterfly valve 86 and thus forestall completion of the cycle of the shift into high (note Figs. 14 and 15).

Figure 24:
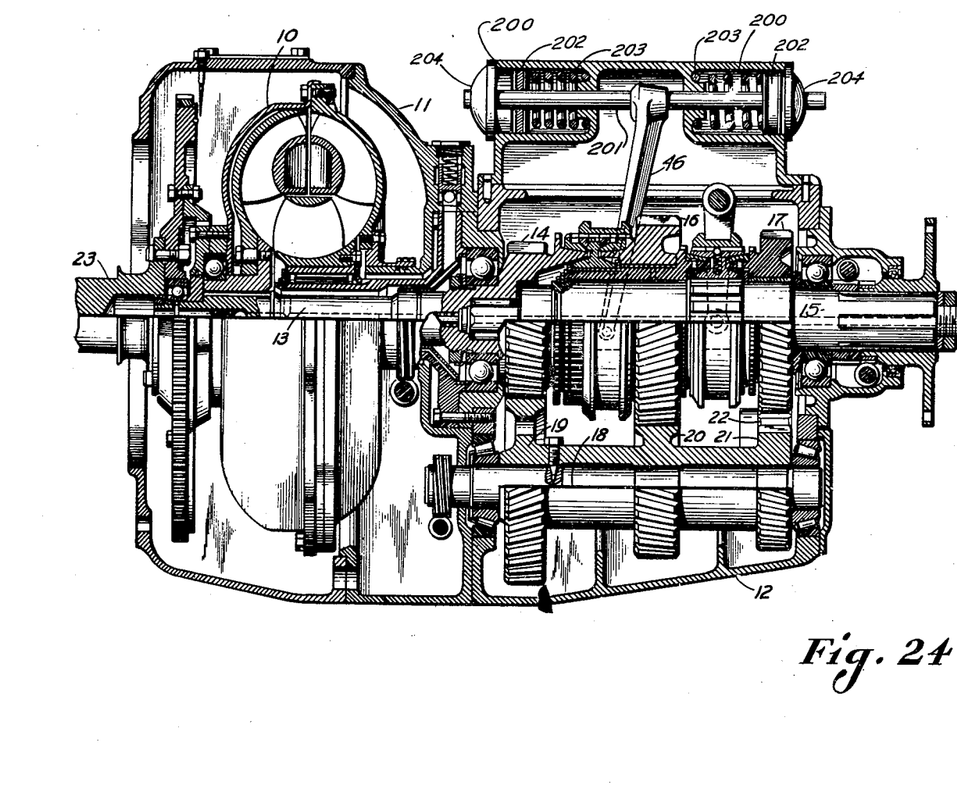
Fig. 24 is a sectional view of the transmission similar to Fig. 1 but illustrating an alternate form of gear shift mechanism.

As illustrated in Fig. 24, the torque converter gear train and control mechanism therefor is similar to the structure heretofore described save only that a pair of opposed cylinders 200 is substituted for the single cylinder shown in Fig. 1. In this embodiment the fork 46 is mounted on a rod 201 having pistons 202 thereon and springs 203 interposed between the pistons and inner walls of the cylinders. Fluid under pressure is admitted through the cylinder heads 204, the conduits therefor being coupled with a two way valve of conventional design which is substituted for the valve 88 indicated in the drawings and referred to in the preceding description.

The utility of this structure resides in the adaptability thereof in such installations as preclude the use of an air compressor due to the size thereof, in machines for use under such climatic conditions as inhibit the use of air and in installations where it is necessary or desirable to effect the reciprocation of the pistons by vacuum.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In combination with an engine, a turbine driven thereby, change speed gearing driven by the turbine and a synchromesh clutch associated with said gearing, apparatus for controlling the actuation of said clutch comprising an electrical switch, mechanism driven at the differential speed of the engine and turbine for the actuation of the switch, a second switch driven by the change speed gearing output, a fluid operated piston coupled with said clutch, means electrically coupled with said switches for the control of said piston, a carburetor valve, means electrically coupled with the first named means for the control of the valve, an engine ignition system and means electrically coupled with the first named means for the control of the ignition system.

2. In a vehicle embodying an engine, a turbine driven thereby, a change speed gear set driven by the turbine and a synchromesh clutch in the gear set for high and low speed drive, apparatus for controlling the actuation of said clutch comprising a speed responsive mechanism driven by the change speed gear set, a switch actuated by the speed responsive mechanism, a second speed responsive mechanism driven by the engine and turbine at the speed difference thereof, a switch actuated by the second speed responsive mechanism, a fluid actuated piston coupled with said clutch, a solenoid for the control of the piston, a carburetor valve, a solenoid coupled with the valve for the actuation thereof, electric connections between said switches and said solenoids, a multi-contact switch actuated by said piston, a solenoid-operated switch electrically connected between said speed responsive switches, a second solenoid-operated switch controlled by the first named solenoid-operated switch for interrupting the electric connection between the carburetor solenoid and the first named speed responsive mechanism, electrical connections between the piston solenoid and said speed responsive mechanisms, said piston solenoid being controlled by the first named speed responsive mechanism switch through the first named solenoid-operated switch.

3. In a motor vehicle embodying an engine, a torque converter having a turbine therein driven thereby, a change speed gear train driven by the turbine and a synchromesh clutch for high and low gear; apparatus for shifting said clutch into high or low gear drive responsive to the torque loads upon the vehicle comprising a carburetor intake valve, an engine ignition system, a speed responsive mechanism driven by the output shaft of said change speed gear train, a speed responsive mechanism driven by the engine and turbine at the speed difference thereof, a fluid operated piston connected to said clutch, electric means governed by said speed responsive mechanisms controlling the operation of said piston and electric means controlled by said piston for the actuation of said valve and the interruption of said ignition system.

4. A transmission comprising a drive shaft, a turbine driven thereby, a gear train driven by said turbine, a driven shaft in said gear train, a synchromesh clutch for high and low speed drive in said gear train, a second synchromesh clutch in said gear train for forward and reverse gear drive, a sleeve for driving the driven shaft when both clutches are engaged with the sleeve, a fluid operated piston coupled with the high and low gear clutch for the actuation thereof, a speed responsive mechanism driven at the speed difference between the drive shaft and turbine, a second speed responsive mechanism driven by the driven shaft in the gear train, electric means operated by said speed responsive mechanisms for the control of said piston, and electric means associated with the forward and reverse gear drive for controlling the operation of the first named electric means.

5. In combination with an engine, a transmission comprising a turbine driven by the engine, a gear train driven by said turbine, a driven shaft in said gear train, a synchromesh clutch for high and low gear drive in said gear train, a second synchromesh clutch for forward and reverse gear drive in said gear train, means providing a driving connection from the drive shaft to the driven shaft when both of said clutches are engaged with the said means, a fluid operated piston coupled with the high and low gear clutch for the actuation thereof, a speed responsive mechanism driven at the speed difference between the engine and the turbine, a second speed responsive mechanism driven by the driven shaft, electric means operatively connected with said speed responsive mechanism for controlling said fluid operated piston, electric means actuated by the movement of said piston for controlling the speed of the engine and electric means actuated by the forward and reverse gear clutch for controlling the means controlling the operation of the piston.

6. In combination with an engine, a transmission comprising a turbine driven by the engine, a gear train driven by said turbine, a driven shaft in said gear train, a synchromesh clutch for high and low gear drive in said gear train, a second synchromesh clutch for forward and reverse gear driven in said gear train, means providing a driving connection from the drive shaft to the driven shaft when both of said clutches are engaged with said means, a fluid operated piston coupled with the high and low gear clutch for the actuation thereof, a governor driven at the speed difference between the engine and turbine, an electric switch actuated by said governor, a second governor driven by said driven shaft, an electric switch actuated by the second governor, electric means for the control of said piston governed by said electric switches, a multi-contact switch actuated by said piston, electrical connections for the multi-contact switch for coupled with said electric switches, an engine ignition circuit electrically connected with said multi-contact switch and an electric switch actuated by the forward and reverse gear clutch arranged to interrupt the circuits through the electrical connections to said governor controlled switches.

7. In combination with an engine, a transmission comprising a turbine driven by the engine, a gear train driven by said turbine, a driven shaft in said gear train, a synchromesh clutch for high and low gear drive in said gear train, a second synchromesh clutch for forward and reverse gear drive in said gear train, means providing a driving connection from the drive shaft to the driven shaft when both of said clutches are engaged with said means, a fluid operated piston coupled with the high and low gear clutch for the actuation thereof, a governor driven at the speed difference between the engine and turbine, an electric switch actuated by said governor, a second governor driven by said driven shaft, an electric switch actuated by the second governor, electric means for the control of said piston governed by said electric switches, a multi-contact switch actuated by said piston, electrical connections for the multi-contact switch therefor coupled with said electric switches, an engine ignition circuit connected with and arranged for interruption by said multi-contact switch, a switch actuated by said forward and reverse gear clutch arranged to interrupt the circuits through the electrical connections to said governor controlled switches, and means to shunt the ignition circuit around the multi-contact switch when the engine is idling.

8. In combination, an engine, a turbine driven thereby, change speed gearing driven by said turbine, and a gear shift mechanism in said change speed gearing, apparatus for shifting said gears responsive to the torque loads imposed upon the turbine, comprising a speed responsive mechanism driven at the speed difference between the engine and turbine, a speed responsive mechanism driven by the change speed gearing, electric means coupled with said speed responsive mechanisms for the control of said gear shift mechanism, and electric means actuated by said gear shift mechanism for regulating the speed of the engine during the operation of said gear shift mechanism.

9. In combination, an engine, a turbine driven thereby, change speed gearing driven by said turbine, and a gear shift mechanism in said change speed gearing, apparatus for shifting said gears responsive to the torque loads imposed upon the turbine comprising a speed responsive mechanism driven at a speed which is a function of the speeds of said engine and said turbine, a speed responsive mechanism driven by said change speed gearing, electric means coupled with said speed responsive mechanisms for the control of said gear shift mechanism for regulating the operation of the engine.

10. In combination with an engine, a transmission comprising a turbine driven by the engine, a gear train driven by said turbine, a driven shaft in said gear train, a synchromesh clutch for high and low gear drive in said gear train, a second synchromesh clutch for forward and reverse gear drive in said gear train, means providing a driving connection from the drive shaft to the driven shaft when both of said clutches are engaged with said means, mechanism for shifting said high and low gear clutch, a speed responsive mechanism driven at a speed which is a function of the speeds of said engine and said turbine, a second speed responsive mechanism driven by the driven shaft, electric means operatively connected with said speed responsive mechanisms for shifting said high and low gear clutch, and means actuated by said clutch shifting mechanism for controlling the speed of the engine.

11. In combination with an engine, a hydraulic transmission driven thereby, a plural-ratio gear box driven by the hydraulic transmission, means for shifting gears in the gear box, and an output shaft driven by the gear box; a mechanism for operating the shifting means in response to the character of the load on the output shaft in accordance with engine characteristics, comprising a first control means responsive to output shaft speed and operative to condition the shifting means to shift to a higher gear when the output shaft speed exceeds a predetermined value, and to a lower gear when the output shaft speed is less than the predetermined value, a second control means responsive to the difference between engine and hydraulic transmission output speeds and operative to condition the shifting means to shift to a higher gear when the said difference is less than a predetermined value, and to a lower gear when the said difference is greater than the said value.

12. In combination with an engine, a hydraulic transmission driven thereby, a plural-ratio gear box driven by the hydraulic transmission, means for shifting gears in the gear box, and an output shaft driven by the gear box; a mechanism for operating the shifting means in response to the character of the load on the output shaft in accordance with engine characteristics, comprising a first control means responsive to output shaft speed and operative to condition the shifting means to shift to a higher gear when the output shaft speed exceeds a predetermined value, and to a lower gear when the output shaft speed is less than the predetermined value; a second control means responsive to the difference between engine and hydraulic transmission output speeds and operative to condition the shifting means to shift to a higher gear when the said difference is less than a predetermined value, and to a lower gear when the said difference is greater than the said value; the first control means being normally dominant when output shaft speed is below the predetermined value, and the second control means normally being dominant otherwise.

13. In combination with an engine, a hydraulic transmission driven thereby, a plural-ratio gear box driven by the hydraulic transmission, means for shifting gears in the gear box, and an output shaft driven by the gear box; a mechanism for operating the shifting means in response to the character of the load on the output shaft in accordance with engine characteristics, comprising a first control means responsive to output shaft speed and operative to condition the shifting means to shift to a higher gear when the output shaft speed exceeds a predetermined value, and to a lower gear when the output shaft speed is less than the predetermined value; a second control means responsive to the difference between engine and hydraulic transmission output speeds and operative to condition the shifting means to shift to a higher gear when the said difference is less than a predetermined value, and to a lower gear when the said difference is greater than the said value; a holding device rendered operative by action of the second control means effecting a shift to the lower gear; means actuated by the holding device to prevent operation of the shifting means to shift to the higher gear; and means operated by the first control means in response to a second predetermined output shaft speed higher than the first named output shaft speed for rendering the holding device inoperative.

14. In combination with an engine, a hydraulic transmission driven thereby, a plural-ratio gear box driven by the hydraulic transmission, means for shifting gears in the gear box, and an output shaft driven by the gear box; a mechanism for operating the shifting means in response to the character of the load on the output shaft in accordance with engine characteristics, comprising a first control means responsive to output shaft speed and operative to condition the shifting means to shift to a higher gear when the output shaft speed exceeds a predetermined value, and to a lower gear when the output shaft speed is less than the predetermined value; a second control means responsive to the difference between engine and hydraulic transmission output speeds and operative to condition the shifting means to shift to a higher gear when the said difference is less than a predetermined value, and to a lower gear when the said difference is greater than the said value; the first control means being normally dominant when output shaft speed is below the predetermined value, and the second control means normally being dominant otherwise; a holding device rendered operative by action of the second control means in effecting a shift to the lower gear; means actuated by the holding device to prevent operation of the shifting means to shift to the higher gear; and means operated by the first control means in response to a second predetermined output shaft speed higher than the first named output shaft speed for rendering the holding device inoperative.

15. In a prime mover, an engine, a hydraulic transmission driven thereby, a synchromesh transmission driven by the hydraulic transmission, and automatic means responsive to load conditions for shifting the synchromesh transmission, the said automatic means including a gang switch coupled to a shifting fork of the transmission, a first pair of contacts in the gang switch alternately engaged in the extreme positions of the fork, and open in medial positions of the fork, an ignition circuit for the engine connected through the said contacts in parallel, a solenoid for closing a throttle of the engine, a third contact of the gang switch open only when the fork is in its higher gear position, means for energizing the solenoid through the third contact when the transmission is in its lower gear, whereby the solenoid circuit will be broken by the third contact as the shift to higher gear is completed, a fourth contact of the gang switch closed only when the fork is in its higher gear position, and means for energizing the solenoid through the fourth contact when the transmission is in its higher gear, whereby the solenoid circuit will be broken by the fourth contact as soon as the higher gear is out of mesh when shifting to the lower gear.

16. In a prime mover, an engine, a hydraulic transmission driven thereby, a synchromesh transmission driven by the hydraulic transmission, and automatic means responsive to load conditions for shifting the synchromesh transmission, the said automatic means including a gang switch coupled to a shifting fork of the transmission, a first pair of contacts in the gang switch alternately engaged in the extreme positions of the fork, and open in medial positions of the fork, an ignition circuit for the engine connected through the said contacts in parallel, a bypass circuit for the ignition shunting the said contacts, and a switch operatively connected to a throttle control in said bypass circuit adapted to open said bypass circuit when the throttle is opened.

RENKE BRUNKEN.

REFERENCES CITED

The following references are of record in the file of this patent:

UNITED STATES PATENTS

| Number | Name | Date |
| --- | --- | --- |
| 1,624,008 | Ricker | Apr. 12, 1927 |
| 2,298,649 | Russell | Oct. 13, 1942 |
| 2,322,479 | Schjolin | June 22, 1943 |
| 2,332,593 | Nutt et al. | Oct. 26, 1943 |
| 2,373,453 | Brunken | Apr. 10, 1945 |

FOREIGN PATENTS

| Number | Country | Date |
| --- | --- | --- |
| 446,979 | Great Britain | May 8, 1936 |